United States Patent
Hayashi et al.

(10) Patent No.: US 9,994,056 B2
(45) Date of Patent: Jun. 12, 2018

(54) TRANSFER SHEET

(71) Applicant: Dai Nippon Printing Co., Ltd., Tokyo (JP)

(72) Inventors: Kenzo Hayashi, Tokyo (JP); Shinya Yoda, Tokyo (JP); Junpei Oomura, Tokyo (JP); Mitsuhiro Oota, Tokyo (JP); Yuki Iwasaki, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days. days.

(21) Appl. No.: 15/504,085

(22) PCT Filed: Sep. 16, 2015

(86) PCT No.: PCT/JP2015/076348
§ 371 (c)(1),
(2) Date: Feb. 15, 2017

(87) PCT Pub. No.: WO2016/043236
PCT Pub. Date: Mar. 24, 2016

(65) Prior Publication Data
US 2017/0259601 A1   Sep. 14, 2017

(30) Foreign Application Priority Data

Sep. 16, 2014  (JP) .................................. 2014-187784
Sep. 30, 2014  (JP) .................................. 2014-202110
Sep. 15, 2015  (JP) .................................. 2015-181643

(51) Int. Cl.
*B41M 5/392*  (2006.01)
*B41M 5/44*   (2006.01)

(52) U.S. Cl.
CPC .............. *B41M 5/44* (2013.01); *B41M 5/392* (2013.01); *B41M 2205/02* (2013.01); *B41M 2205/30* (2013.01); *B41M 2205/38* (2013.01)

(58) Field of Classification Search
CPC .... B41M 5/392; B41M 5/44; B41M 2205/04; B41M 2205/06; B41M 2205/30; B41M 2205/38
(Continued)

(56) References Cited

U.S. PATENT DOCUMENTS 6,214,149 B1 * 4/2001 Nakano .................. B41M 5/345
156/235
6,465,393 B1 * 10/2002 Nakano .................. B41M 5/345
428/32.51
(Continued)

FOREIGN PATENT DOCUMENTS

JP   07-065356 A1   3/1995
JP   07-329432 A1   12/1995
(Continued)

OTHER PUBLICATIONS

English translation of the International Preliminary Report on Patentability (Application No. PCT/JP2015/076348) dated Mar. 16, 2017.
(Continued)

*Primary Examiner* — Bruce H Hess
(74) *Attorney, Agent, or Firm* — Burr & Brown, PLLC

(57) ABSTRACT

There is provided a transfer sheet with improvement in smudges and blurs of a transfer sheet when printed matters are produced. A transfer sheet according to the present invention comprises a substrate, and in the order a peel layer and a transfer layer on the substrate, wherein the peel layer contains a binder resin containing an acrylic-based resin of more than 0 mass % and 49 mass % or less and a vinyl chloride-vinyl acetate resin of 51 mass % or more and less than 100 mass %.

9 Claims, 2 Drawing Sheets

(58) Field of Classification Search
USPC ............................... 428/32.69, 32.81, 32.82
See application file for complete search history.

(56) References Cited

U.S. PATENT DOCUMENTS

| | | |
|---|---|---|
| 2003/0179274 A1 | 9/2003 | Morizumi et al. |
| 2007/0292639 A1 | 12/2007 | Hirota |
| 2009/0068456 A1 | 3/2009 | Masuda et al. |
| 2010/0089526 A1 | 4/2010 | Morizumi et al. |

FOREIGN PATENT DOCUMENTS

| | | |
|---|---|---|
| JP | 2000-177252 A1 | 6/2000 |
| JP | 2002-230738 A1 | 8/2002 |
| JP | 2003-266956 A1 | 9/2003 |
| JP | 2006-123526 A1 | 5/2006 |
| JP | 2011-073383 A1 | 4/2011 |
| JP | 2011-093296 A1 | 5/2011 |
| JP | 2011-201181 A1 | 10/2011 |
| JP | 2014-046573 A1 | 3/2014 |

OTHER PUBLICATIONS

International Search Report and Written Opinion (Application No. PCT/JP2015/076348) dated Dec. 15, 2015.
European Search Report, European Application No. 15843016.5, dated Mar. 22, 2018 (7 pages).

\* cited by examiner

[Fig. 1]
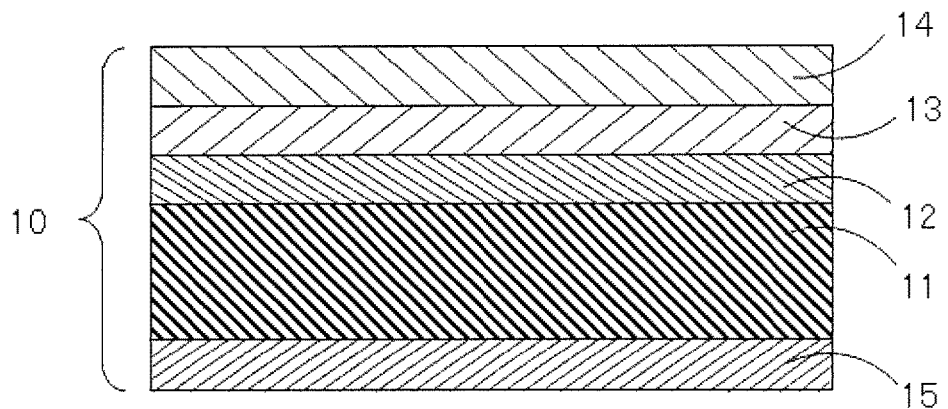
[Fig. 2]
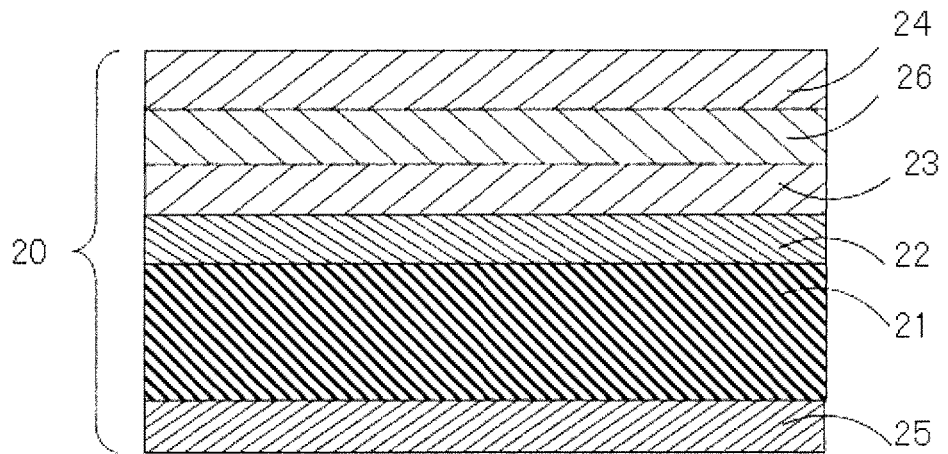

[Fig. 3]
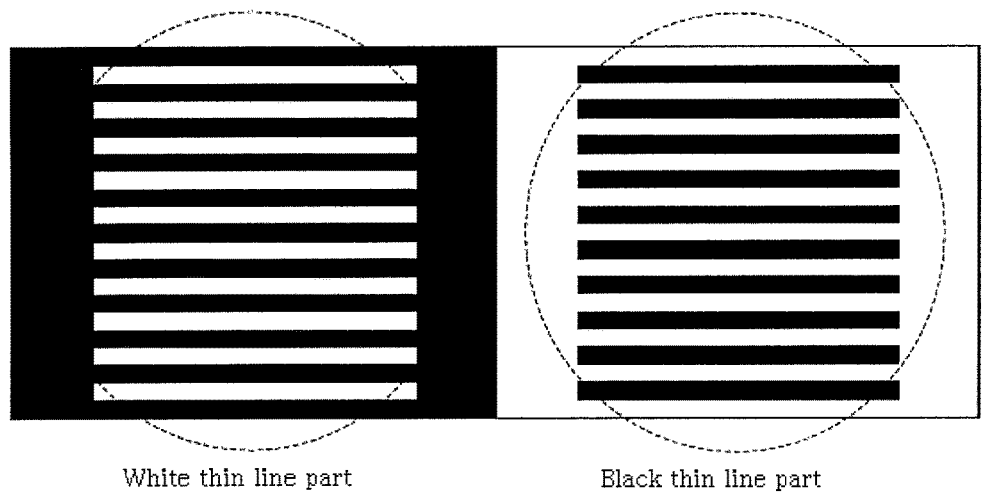
White thin line part      Black thin line part

TRANSFER SHEET

TECHNICAL FIELD

The present invention relates to a thermal transfer sheet and more particularly, to a transfer sheet comprising a substrate and in the order at least one layer of a release layer, a peel layer and an intermediate layer on the substrate and a transfer layer.

BACKGROUND ART

Currently, thermal transfer recording methods are widely used as a convenient printing method. Since thermal transfer methods allow to form various images, they are used in printing materials which may have a relatively few printing pages, for example, in making ID cards such as identification papers and business photography, or printing machines for personal computers, and video printers.

When roughly classifying thermal transfer sheets used in thermal transfer recording methods, they are classified by a so-called fusion transfer type, in which a heat-fusion colored layer fusion-softens and the heat-fusion colored layer is transferred to an object, i.e. a receiving sheet, and a so-called sublimation transfer type, in which dyes in a colorant layer sublimate and transfer to a receiving sheet by sensing heat. When in making IDs such as identification papers, and particularly when in forming uniform images such as texts and figures, heat-fusion type thermal transfer sheets are used. A thermal transfer sheet by stacking in the order a substrate, a release layer comprising an acrylic-styrene-based resin and a heat fusion colored layer is known as an example of such heat-fusion type thermal transfer sheet. However, when an acrylic-styrene-based resin is used as the release layer of the thermal transfer sheet, the release layer softens due to the heat conveyed from a thermal head and the peel force between the release and the transfer layers becomes high, thus problems may occur such as transfer failure, where the transfer layer is not transferred, whitening of an image due to roughening of a peel interface, and abnormal noise at peeling.

Further, when IDs such as identification papers are made by using the above mentioned thermal transfer sheet, a method is known for forming a protective layer on the image by superimposing a protective layer thermal transfer sheet stacked by, in the order, a substrate, a release layer consisting of a polyvinyl alcohol (PVA) and a water-dispersible urethane, and a protective layer, on the image obtained by the thermal transfer of the heat fusion colored layer, and transferring the protective layer by using such as a thermal head or a heating roll for protection of images. Furthermore, a method for forming a lamination material is known by using the heat roll after forming the protective layer on the image for improving image durability. However, a water-based release layer (a release layer comprising a polyvinyl alcohol and a water-dispersible urethane) is unstable to moisture and especially under high moisture environment; problems may occur such as whitening of an image due to roughening of a peel interface, and abnormal noise at peeling.

In order to solve the problems as described above, it is proposed to provide a thermal transfer sheet comprising a release layer containing polyamide based resins to reduce the heat applied to the thermal head and the effect of moisture environment and improve the peeling (refer to patent document 1). Further, a thermal transfer sheet containing a combination of specific resin components on a substrate sheet through a release layer is proposed (refer to patent document 2). Furthermore, a thermal transfer sheet is proposed that provides in a serial manner, a peel layer and a colored adhesive layer on a substrate, and in which the colored adhesive layer does not contain a heat-fusion material but contain specific particles in specific proportions (refer to patent document 3).

PRIOR ART DOCUMENT

Patent Document

Patent document 1: Japanese Patent Application Laid-Open No. 2011-73383
Patent document 2: Japanese Patent Application Laid-Open No. 2011-201181
Patent document 3: Japanese Patent Application Laid-Open No. 2000-177252

SUMMARY OF THE INVENTION

Problems to be Solved by the Invention

However, a new technical problem was found that, in order to form images of minute texts and figures and the like, smudges and blurs of the transfer layer appear by the use of the thermal transfer sheet as described in patent document 1.

The present invention is based on considering the above technical background and the purpose is to provide a thermal transfer sheet with improvement in smudges and blurs of the transfer layer when printed matters are prepared.

Means for Solving the Problems

The inventors have closely examined to solve the above problems and found that by using the transfer sheet comprising a peel layer of a specific composition including a binder resin, the above problems can be solved. The present invention has been accomplished based on such findings.

Specifically, in accordance with the first embodiment of the present invention, there is provided a transfer sheet comprising a substrate; and in the order a peel layer and a transfer layer on the substrate, wherein the peel layer contains a binder resin and the binder resin contains more than 0 mass % and 49 mass % or less of an acrylic based resin, and 51 mass % or more and less than 100 mass % of a vinyl chloride-vinyl acetate resin.

Preferably, in the first embodiment of the present invention, a release layer is further comprised in between the substrate and the peel layer.

Specifically, in accordance with a second embodiment of the present invention, there is provided a transfer sheet comprising a substrate; in the order a release layer and a transfer layer on the substrate, wherein the binder resin contains more than 0 mass % and 49 mass % or less of urethane-based resin, and 51 mass % or more and less than 100 mass % of acetal-based resin.

Preferably, in the second embodiment of the present invention, a peel layer is further comprised in between the release layer and the transfer layer.

Specifically, in a third embodiment of the present invention, there is provided a transfer sheet comprising a substrate; in the order a peel layer, an intermediate layer and a transfer layer on the substrate, wherein the intermediate layer contains at least an inorganic colloid material.

Preferably, in the third embodiment of the present invention, the inorganic colloid material is at least one of alumina sol or colloidal silica.

Preferably, in the second and third embodiments of the present invention, the peel layer contains a binder resin and the binder resin contain more than 0 mass % and 49 mass % or less of an acrylic based resin, and 51 mass % or more and 100 mass % or less of a vinyl chloride-vinyl acetate resin.

Preferably, in the first to the third embodiments of the present invention, the peel layer further contains a silicone oil and/or a wax component.

Preferably, in the first to the third embodiments of the present invention, the total content of the silicone oil and the wax component in the peel layer is 0.1 mass % or more and 15 mass % or less, based on the solid content of mass of the binder resin.

Preferably, in the first to the third embodiments of the present invention, the transfer layer contains a colorant.

Advantageous Effects of Invention

In accordance with the present invention, a transfer sheet with improvement in smudges and blurs of a transfer layer when printed matters are prepared may be provided. The transfer sheet of the present invention is possible to transfer thin lines under low application energy when printing and improve the printing quality.

BRIEF DESCRIPTION OF THE DRAWING

FIG. 1 is a schematic cross-sectional view showing one embodiment of the transfer sheet according to the present invention.

FIG. 2 is a schematic cross-sectional view showing one embodiment of the transfer sheet according to the present invention.

FIG. 3 is a view showing printed patterns (white and black lines) under transfer conditions in evaluation of thin line reproducibility.

EMBODIMENTS FOR CARRYING OUT THE INVENTION

<Transfer Sheet>

The transfer sheet according to the present invention comprises a substrate, a transfer layer, and further in the order at least one, preferably two, more preferably three layer(s) of a release layer, a peel layer and an intermediate layer between the substrate and the transfer layer. The release layer, the peel layer and the intermediate layer may be suitably combined and used. Further, a heat-resistant layer may be further comprised to the face of the opposite side of the peel layer of the substrate. A layer construction of the transfer sheet according to the present invention is described below with making reference to the drawings.

The schematic cross-sectional view of one embodiment of the transfer sheet according to the present invention is shown in FIGS. 1 and 2. Transfer sheet 10 shown in FIG. 1 comprises in the order a substrate 11, a release layer 12 on the substrate 11, a peel layer 13, a transfer layer 14 and further a heat-resistant layer 15 on the face of the opposite side of the peel layer 12 of the substrate 11. Transfer sheet 20 shown in FIG. 2 comprises in the order a substrate 21, a release layer 22 on the substrate 21, a peel layer 23, an intermediate layer 26, a transfer layer 24 and further a heat-resistant layer 25 to the face of the opposite side of the release layer 22 of the substrate 21. Each layer constituting the transfer sheet according to the present invention will be described in details. Each layer constituting the transfer sheet may be described separately as Embodiment 1, comprising a release layer of a specific composition as an essential construction, Embodiment 2, comprising a peel layer as an essential construction and Embodiment 3, comprising an intermediate layer as an essential construction.

<Substrate>

The substrate of the first to the third embodiments of the present invention preferably has mechanical strength high enough to pose no problem in handling even in a heated state because heat is applied in thermal transfer as well as having a role to hold the transfer layer. Examples of the material for such substrate include polyethylene terephthalate films, 1,4-polycyclohexylene dimethylene terephthalate films, polyethylene naphthalate films, polyphenylene sulfide films, polystyrene films, polypropylene films, polysulfone films, aramid films, polycarbonate films, polyvinyl alcohol films, cellophane, cellulose derivatives such as cellulose acetate, polyethylene films, polyvinyl chloride films, nylon films, polyimide films, and ionomer films. Further, the thickness of the substrate is preferably 0.5 μm or more and 50 μm or less, and more preferably 1 μm or more and 10 μm or less.

A substrate with an easy-adhesion treatment on the surface may be used. The easy-adhesion treatment forms an easy-adhesion layer between the substrate and an easy-adhesion layer described below. Preferably, the easy-adhesion layer consists of, for example aqueous acrylics, aqueous polyesters and aqueous epoxy compounds. Aqueous acrylics are water-soluble or water-dispersible acrylic-based resins and preferably, the main components are alkyl acrylates or alkyl methacrylates, which are preferably 30 mol % or more and 90 mol % or less and copolymerized. Aqueous polyesters are water-soluble or water-dispersible polyester-based resins and the component constructing such polyester based resins are for example, polyvalent carboxylic acid or polyvalent hydroxyl compounds. Aqueous epoxy compounds are water-soluble or water-dispersible, preferably containing water-soluble epoxy-group, wherein at least 1 or more, preferably 2 or more of epoxy groups are contained in the molecule. Such aqueous epoxy compounds are glycidyl ether of glycols, polyethers, polyols, glycidyl ester of carboxylic acids, amines substituted by glycidyl, and preferably glycidyl ethers. Easy-adhesion treatment preferably uses a method to form an easy-adhesion coating on the surface of the substrate.

<Release Layer of the First Embodiment>

The release layer according to the first embodiment of the present invention is a layer provided so that the transfer layer can easily peel off from substrate (at the interface of the release layer and the transfer layer) when thermally transferred. The release layer is preferably formed of a material having releasability and for example, preferably comprises a binder resin and additives such as a release agent. Binder resins include such as urethane-based resins, acetal-based resins, polyamide-based resins, melamine-based resins, polyol resins, cellulosic resins and poly vinyl alcohols and preferably, urethane-based resins and acetal-based resins are used. The content of the urethane-based resin in the release layer is preferably more than 0 mass % and 49 mass % or less, more preferably 5 mass % or more and 45 mass % or less, and even more preferably 10 mass % or more and 40 mass % or less and the content of the acetal-based resin in the peel layer is preferably 51 mass % or more and less than 100 mass %, more preferably 55 mass % or more and 95 mass % or less, and even more preferably 60 mass % or more and 90 mass or less, based on the total amount of the solid content of the binder resin. If the content of the urethane-based resin and acetal-based resin are within the above range, a transfer sheet can be obtained with improvement in smudges and blurs of the transfer layer when printed matters are prepared.

Release agents used in the release layer include such as silicone oils, phosphoric ester based plasticizers, fluorine-based compounds, waxes, metal soaps and fillers and preferably, silicone oils are used.

The method to form the release layer is not particularly limited and it may be formed by a conventionally known coating method. For example, it may be formed by adding the above mentioned binder resins and if necessary, additives such as release agents to an appropriate solvent and after preparing a coating liquid by dissolving or dispersing each component, applying the coating liquid on to the substrate by using known methods such as gravure coating, roll coating, comma coating, gravure printing, screen printing and gravure reverse roll coating, and drying. Further, the thickness of the release layer is, without particular limitation, preferably 0.05 µm or more and 5.0 µm or less, and more preferably 0.1 µm or more and 3 µm or less.

<Peel Layer of the First Embodiment>

The peel layer according to the first embodiment of the present invention is a layer provided so that transfer layer can peel off easily from the substrate (at the interface of the release layer and the peel layer) when thermally transferred. The peel layer comprises a binder resin. An acrylic-based resin and a vinyl chloride-vinyl acetate resin (a vinyl chloride-vinyl acetate copolymer) are used as binder resins used in the peel layer and additional resins other than these may also be used. The content of the acrylic-based resin in the peel layer is preferably more than 0 mass % and 49 mass % or less, more preferably 5 mass % or more and 45 mass % or less, and even more preferably 10 mass % or more and 40 mass % or less and the content of the vinyl chloride-vinyl acetate resin in the peel layer is preferably 51 mass % or more and less than 100 mass %, more preferably 55 mass % or more and 95 mass % or less, and even more preferably 60 mass % or more and 90 mass % or less, based on the total amount of the solid content of the binder resin. If the content of the acrylic-based resin and vinyl chloride-vinyl acetate resin are within the above range, a transfer sheet can be obtained with improvement in smudges and blurs of the transfer layer when printed matters are prepared. Further, as additional resins, for example: vinyl resins other than vinyl chloride-vinyl acetate resins such as polyvinyl alcohol resins, polyvinyl acetate resins, polyvinyl butyral resins, polyvinyl acetal resins and polyvinyl pyrrolidones; polyester-based resins such as polyethylene terephthalate resins and polyethylene naphtalate resins; urethane-based resins such as polyurethane acrylate; cellulose-based resins such as ethylcellulose resins, hydroxyethylcellulose resins, ethylhydroxylcellulose resins, methylcellulose resins and ethyl acetate cellulose resins; polyamide-based resins such as polyamide resins, aromatic polyamide resins and polyamide imide resins; acetal-based resins; and polycarbonate-based resins may be used. The content of the additional resins in the peel layer is preferably more than 0 mass % and 20 mass % or less, and more preferably 5 mass % or more and 15 mass % or less, based on the total amount of the solid content of the binder resin.

In the present invention, the acrylic-based resins include polymers or its derivatives of monomers of (meth) acrylate, polymers or its derivatives of monomers of (meth) acrylate ester, copolymers or its derivatives of monomers of (meth) acrylic and other monomers, and copolymers or its derivatives of (meth) acrylate ester and other monomers. Other "based resins" also may include copolymers or its derivatives of other monomers other than the main components.

The peel layer may further comprise additives such as a peel agent. Silicone oils and/or wax components are used as a peel agent. Addition of peel agents such as silicone oils and wax components to the peel layer can give a transfer sheet with improvement in smudges and blurs (excellent storage stability) of the transfer sheet when printed matters are prepared, even after storing the transfer sheet under environment of high temperatures. Silicone oils include, such as amino-modified silicones, epoxy-modified silicones, aralkyl-modified silicones, epoxy-aralkyl-modified silicones, alcohol-modified silicones, vinyl-modified silicones, and urethane-based silicones, and preferably, epoxy-modified silicone oils are used. A variety of waxes are referred to as wax components, for example, microcrystalline wax, carnauba wax, paraffin wax, Fischer-Tropsch wax, various low molecular weight polyethylenes, tree wax, beeswax, spermaceti, insect wax, wool wax, shellac wax, candelilla wax, petro lactam, partially denatured waxes, fatty acid esters and fatty acid amides, and preferably, polyethylene waxes are used.

The content of the peel agents (the total content of silicone oils and wax components) in the peel layer is preferably 0.1 mass % or more and 15 mass % or less, more preferably 0.5 mass % or more and 12 mass % or less, and even more preferably 1 mass % or more and 10 mass % or less, based on the solid content of mass of the binder resins. If the content of the peel agents are within the above range, a transfer sheet can be obtained with improvement in smudges and blurs (excellent storage stability) of the transfer layer when printed matters are prepared, even after storing the transfer sheet under environment of high temperatures.

The method to form the peel layer is not particularly limited and it may be formed by a conventionally known coating method. For example, it may be formed by adding the above mentioned binder resin and if necessary, additives such as a peel agent to an appropriate solvent and after preparing a coating liquid by dissolving or dispersing each component, applying the coating liquid on to the substrate or the release layer by using known methods such as gravure coating, roll coating, comma coating, gravure printing, screen printing and gravure reverse roll coating, and drying. Further, the thickness of the peel layer is, without particular limitation, preferably 0.05 µm or more and 5.0 µm or less, and more preferably 0.1 µm or more and 3 µm or less.

<Release Layer of the Second Embodiment>

The release layer according to the second embodiment of the present invention is a layer provided so that the transfer layer can easily peel off from substrate (at the interface of the release layer and the transfer layer) when thermally transferred. The release layer is preferably formed of a material having releasability and preferably comprises a binder resin and further, additives such as a release agent. An urethane-based resin and an acetal-based resin are used as a binder resin used in the release layer and additional resins other than these may be used. The content of the urethane-based resin in the release layer is preferably more than 0 mass % and 49 mass % or less, more preferably 5 mass % or more and 45 mass % or less, and even more preferably 10 mass % or more and 40 mass % or less and the content of the acetal-based resin in the peel layer is preferably 51 mass % or more and less than 100 mass %, more preferably 55 mass % or more and 95 mass % or less, and even more preferably 60 mass % or more and 90 mass % or less, based on the total amount of the solid content of the binder resin.

If the content of the urethane-based resin and acetal-based resin are within the above range, a transfer sheet can be obtained with improvement in smudges and blurs of the transfer layer when printed matters are prepared. Further, additional resins can be used for example: acrylic-based resins such as poly(meth)acrylates and poly(meth)acryl amides; vinyl-based resins such as polyvinyl alcohol resins, polyvinyl acetate resins, vinyl chloride-vinyl acetate copolymers (vinyl chloride-vinyl acetate copolymer resins), polyvinyl butyral resins, polyvinyl acetal resins and polyvinyl pyrrolidones; cellulose-based resins such as ethylcellulose resins, hydroxyethylcellulose resins, ethylhydroxylcellulose resins, methylcellulose resins and cellulose acetate resins; polyamide-based resins such as poly-amide based resins, aromatic polyamide resins and polyamide imide resins; and polycarbonate-based resins. The content of the additional resins in the release layer is preferably more than 0 mass % and 20 mass % or less, and more preferably 5 mass % or more and 15 mass % or less, against the total amount of the solid content of the binder resin.

Release agents used in the release layer include such as silicone oils, phosphoric ester based plasticizers, fluorine-based compounds, waxes, metal soaps and fillers and preferably, silicone oils are used.

The method to form the release layer is not particularly limited and it may be formed by a conventionally known coating method. For example, it may be formed by adding the above mentioned binder resins and if necessary, additives such as release agents to an appropriate solvent and after preparing a coating liquid by dissolving or dispersing each component, applying the coating liquid on to the substrate by using known methods such as gravure coating, roll coating, comma coating, gravure printing, screen printing and gravure reverse roll coating, and drying. Further, the thickness of the release layer is, without particular limitation, preferably 0.05 μm or more and 5.0 μm or less, and more preferably 0.1 μm or more and 3 μm or less.

<Peel Layer of the Second Embodiment>

The peel layer according to the second embodiment of the present invention is a layer provided so that transfer layer can peel off easily from the substrate (at the interface of the release layer and the peel layer) when thermally transferred. The peel layer may be formed by using a binder resin. Binder resins used in the peel layer include: acrylic-based resins such as poly(meth)acrylates and poly(meth) acrylic amides; vinyl-based resins such as polyvinyl alcohol resins, polyvinyl acetate resins, vinyl chloride-vinyl acetate copolymers (vinyl chloride-vinyl acetate resins), polyvinyl butyral resins, polyvinyl acetal resins and polyvinyl pyrrolidones; polyester-based resins such as polyethylene terephthalate resins and polyethylene naphtalate resins; urethane-based resins such as polyurethane acrylate; cellulose-based resins such as ethylcellulose resins, hydroxylethylcellulose resins, ethylhydroxylcellulose resins, methylcellulose resins and ethyl acetate cellulose resins; polyamide-based resins such as polyamide resins, aromatic polyamide resins and polyamide imide resins; acetal-based resins; and polycarbonate-based resins, and preferably, acrylic-based resins, vinyl-based resins, polyester-based resins, urethane-based resins, acetal-based resins and cellulose-based resins are used.

In the present invention, acrylic-based resins include polymers or its derivatives of monomers of (meth) acrylate, polymers or its derivatives of monomers of (meth) acrylate ester, copolymers or its derivatives of monomers of (meth) acrylic and other monomers, and copolymers or its derivatives of (meth) acrylate ester and other monomers. Other "based resins" also may include copolymers or its derivatives of other monomers other than the main components.

Particularly preferably, acrylic-based resins and vinyl chloride-vinyl acetate resins (vinyl chloride-vinyl acetate copolymers) are used as binder resins used in the peel layer. The content of the acrylic-based resins in the peel layer is preferably more than 0 mass % and 49 mass % or less, more preferably 5 mass % or more and 45 mass % or less, and even more preferably 10 mass % or more and 40 mass % or less and the content of the vinyl chloride-vinyl acetate resins in the peel layer is preferably 51 mass % or more and less than 100 mass %, more preferably 55 mass % or more and 95 mass % or less, and even more preferably 60 mass % or more and 90 mass % or less, based on the total amount of the solid content of the binder resins. If the content of the acrylic-based resins and the vinyl chloride-vinyl acetate resins are within the above range, a transfer sheet can be obtained with improvement in smudges and blurs of the transfer layer when printed matters are prepared.

The peel layer may further comprise additives such as a peel agent. Silicone oils and/or wax components are used as a peel agent. Addition of peel agents such as silicone oils and wax components to the peel layer can give a transfer sheet with improvement in smudges and blurs (excellent storage stability) of the transfer sheet when printed matters are prepared, even after storing the transfer sheet under environment of high temperatures. Silicone oils include, such as amino-modified silicones, epoxy-modified silicones, aralkyl-modified silicones, epoxy-aralkyl-modified silicones, alcohol-modified silicones, vinyl-modified silicones, and urethane-based silicones, and preferably, epoxy-modified silicone oils are used. Wax components include a variety of waxes, for example, microcrystalline wax, carnauba wax, paraffin wax, Fischer-Tropsch wax, various low molecular weight polyethylenes, tree wax, beeswax, spermaceti, insect wax, wool wax, shellac wax, candelilla wax, petro lactam, partially denatured waxes, fatti acid esters and fatty acid amides, and preferably, polyethylene waxes are used.

The content of the peel agents (the total amount of silicone oils and wax components) in the peel layer is preferably 0.1 mass % or more and 15 mass % or less, more preferably 0.5 mass % or more and 12 mass % or less, and even more preferably 1 mass % or more and 10 mass % or less, based on the solid content of mass of the binder resin. If the content of the peel agents are within the above range, a transfer sheet can be obtained with improvement in smudges and blurs (excellent storage stability) of the transfer layer when printed matters are prepared, even after storing the transfer sheet under environment of high temperatures.

The method to form the peel layer is not particularly limited and it may be formed by a conventionally known coating method. For example, it may be formed by adding the above mentioned binder resin and if necessary, additives such as a peel agent to an appropriate solvent and after preparing a coating liquid by dissolving or dispersing each component, applying and drying the coating liquid on to the substrate or the release layer by using known methods such as gravure coating, roll coating, comma coating, gravure printing, screen printing and gravure reverse roll coating. Further, the thickness of the peel layer is, without particular limitation, preferably 0.05 μm or more and 5.0 μm or less, and more preferably 0.1 μm or more and 3 μm or less.

<Intermediate Layer>

The intermediate layer according to the third embodiment of the present invention contains at least an inorganic colloid material and the main components contained are such inorganic colloid material and a binder resin. By providing the inorganic colloid material contained intermediate layer between the peel layer and the transfer layer, the intermediate layer and the transfer layer peel off from the thermal transfer sheet and improve the transferability of the transfer to the object. Accordingly, thin lines can be transferred under low application energy conditions at printing, and the image formation can be performed with high printing quality. The transfer sheet in the first and second embodiments of the present invention may be further provided with the intermediate layer of the third embodiment.

The mechanism of improvement in the above mentioned transferability upon providing the intermediate layer is yet to be explained at the moment but it is presumed that the presence of the intermediate layer makes it possible to, fully retain the heat applied to the intermediate and the transfer layers by means of heating such as thermal heads, giving improvement of transferability of the intermediate and the transfer layers. In other words, the intermediate and the transfer layers act as roles to prevent the heat applied to the intermediate and the transfer layers from diffusing to the substrate sheet side.

The inorganic colloid materials may include, for example, colloidal silica, alumina sol, colloidal allumina, cationic aluminum oxide or hydrates thereof. Among these, colloidal silica and alumina sol are preferable. It is yet to be explained at the moment the detailed reason why colloidal silica and alumina sol are preferable but they incline to have high thermal conductivity compared to other inorganic colloid materials and it is understood that this high thermal conductivity is contributing to the improvement in transferability of the thermal transfer sheet.

The above mentioned inorganic colloid materials are colloids in which metal oxides, such as silica and allumina as hydrates, are dispersed to the disperse media such as water, and namely preferably used in zol conditions. Inorganic colloids explained herein employs alumina sol as an example. However the inorganic colloid materials are not limited to alumina sol. Allumina itself is a powder and is an aggregate even by dispersing them but alumina sot is a colloid in which the alumina hydrates are dispersed to the disperse media such as water. Alumina sol is found as a dispersion element of primary particles of alumina. Alumina particles used in alumina sol are preferably feathered.

The particles dispersed by the above inorganic colloid materials have shapes of sphere, feathers or sticks but in each case, preferably the used size of the particles as the primary particles is 10 μm or less. The above stated inorganic colloid materials preferably contain inorganic colloid materials, in which the size of the primary particles is mainly 10 μm or less. The above stated "mainly" means 50 mass % or more against the total mass of the inorganic colloid material contained in the intermediate layer. When the inorganic colloid materials with the size of the primary particles being 10 μm or less are contained, the transparency of the intermediate layer is high, and faithfully reproduce the color phase of the transfer layer at the printing part (the printed matters) transferred to the object, and therefore is preferable. The preferred lower limit of the inorganic colloid materials is not limited, but the size of the primary particles is approximately 0.1 μm.

The binder resin in the intermediate layer is preferably capable of satisfying the adhesiveness between the peel layer and the transfer layer. Such binder resins include vinyl resins such as urethane-based resins, polyester-based resins, polyvinyl pyrrolidone resins and polyvinyl alcohol resins and polyamide epoxy-based resins. The content of the inorganic colloid material and the binder resin in the intermediate layer is not limited, but the content of the inorganic colloid material is preferably 5 mass % or more and 100 mass % or less, and particularly preferably 50 mass % or more and 90 mass % or less, against the total mass of the inorganic colloid materials and the binder resin. The content of the inorganic colloid material within this range will improve the transferability of the thermal transfer sheet and the printing quality becomes high under low energy conditions at printing, for example, thin lines can be transferred.

The method to form the intermediate layer may be formed, without particular limitation, by preparing the coating liquid for the intermediate layer, in which the listed binder resins and inorganic colloid materials as above with additives added if necessary are dispersed or dissolved into an appropriate solvent, and coating/drying this onto the peel layer by methods such as gravure coating and gravure reverse roll coating. Preferably, the coating amount of the intermediate layer is, without particular limitation, approximately from 0.1 g/m$^2$ to 5 g/m$^2$ when dried.

<Release Layer of the Third Embodiment>

The release layer in the third embodiment of the present invention may use either of the release layer of the above stated first or the second embodiments.

<Peel Layer of the Third Embodiment>

The peel layer in the third embodiment of the present invention may use either of the peel layer of the above stated first or the second embodiments.

<Transfer Layer>

The transfer layer according to the first to the third embodiments of the present invention is a layer peeled off from the release layer and/or the peel layer and transferred on to the object by superimposing the transfer sheet and the object, and heating the back face side (the side not provided with the transfer layer of the substrate) of the substrate by conventionally known heating methods, such as printing machines with thermal heads for thermal transfer.

The transfer layer preferably comprises a binder resin and a colorant used for the transfer layer in order to be transferred onto the object and to form images such as texts and figures. Binder resins include: acrylic-based resins such as poly(meth)acrylates and poly(meth)acrylamides; vinyl-based resins such as polyvinyl alcohol resins, polyvinyl acetate resins, vinyl chloride-vinyl acetate resins, polyvinyl butyral resins, polyvinyl acetal resins and polyvinyl pyrrolidones; urethane-based resins such as polyurethane acrylate; cellulose-based resins such as ethylcellulose resins, hydroxyethylcellulose resins, ethylhydroxycellulose resins, methylcellulose resins, cellulose acetate resins; polyamide-based resins such as polyamide resins, aromatic polyamide resins and polyamide imide resins; acetal-based resins; and polycarbonate-based resins and preferably, vinyl-based resins are used.

Conventionally known colorants may be used as a colorant, however preference is made to those having good properties for printed materials, for example with sufficient color density and no changes or bleaching out of colors by light, heat or temperatures and the like. Further, substances such as those developing colors by applying heat or by contacting with the component coated onto the surface of the subject may also be used. Colorants may be of those expressing at least one color selected from the group consisting of black, white, silver, cyan, magenta, yellow, red, green, and blue. Preferably, for example, carbon black for black; titanium oxide for white; and inorganic materials such as alminium for silver; and respective pigments described in C.I. Pigment for cyan, magenta, yellow, red, green, and blue, are used as a colorant.

The method to form the transfer layer is not particularly limited and it may be formed by a conventionally known coating method. For example, it may be formed by adding the above mentioned binder resin and if necessary, additives such as a peel agent to an appropriate solvent and after preparing a coating liquid by dissolving or dispersing each component, applying the coating liquid on to the peel layer by using known methods such as gravure coating, roll coating, comma coating, gravure printing, screen printing and gravure reverse roll coating, and drying. Further, the thickness of the transfer layer is, without particular limitation, preferably 0.5 µm or more and 30 µm or less, and more preferably 1 µm or more and 20 µm or less.

<Heat-Resistant Layer>

The heat-resistant layer according to the first to the third embodiments of the present invention is a layer provided to prevent the negative effects, such as sticking and crinkles due to the applied heat from the back face side of the substrate (the side without the transfer sheet of the substrate) when thermally transferred. Providing the heat-resistant layer will make it possible to thermally print without sticking in the thermal transfer sheet with plastic films, which is poor in heat-resistance, as substrate and make good use of the advantages the plastic films have, such as shred-resistance and easy processing.

Preferably, the heat-resistant layer comprises a binder resin and additives such as a slipping agent. Binder resins used for the transfer layer include: acrylic-based resins such as poly(meth)acrylates and poly(meth)acrylamides; vinyl-based resins such as polyvinyl alcohol resins, polyvinyl acetate resins, vinyl chloride-vinyl acetate resins, polyvinyl butyral resins, polyvinyl acetal resins and polyvinyl pyrrolidones; polyester-based resins such as polyethylene terephthalate resins and polyethylene naphtalate resins; urethane-based resins such as polyurethane acrylate; cellulose-based resins such as ethylcellulose resins, hydroxylethylcellulose resins, ethylhydroxylcellulose resins, methylcellulose resins and ethyl acetate cellulose resins; polyamide-based resins such as polyamide resins, aromatic polyamide resins and polyamide imide resins; acetal-based resins; and polycarbonate-based resins. Slipping agents include such as metal soaps, waxes, silicone oils, fatty acid esters, fillers and talc.

The method to form the heat-resistant layer is not particularly limited and it may be formed by a conventionally known coating method. For example, it may be formed by adding the above described binder resin and if necessary, additives such as a slipping agent to an appropriate solvent and after preparing a coating liquid by dissolving or dispersing each component, applying the coating liquid onto the peel layer by using known methods such as gravure coating, roll coating, comma coating, gravure printing, screen printing and gravure reverse roll coating, and drying. Further, the thickness of the heat-resistant layer is, without particular limitation, preferably 0.5 µm or more and 5.0 µm or less, and more preferably 0.1 µm or more and 3 µm or less.

<Object>

The object which may be used for the transfer of the thermal transfer sheet according to the present invention include for example, but without particular limitation, those provided with a receptive layer which is pigment-recipient on the conventionally known substrate. Substrates for the object may include for example, but without particular limitation, plain papers, high-quality papers, tracing papers and plastic films. The receptive layer in the above stated object may be formed by forming methods such as coating, thermal heads or thermal rolls. When the substrate itself is pigment-recipient, the receptive layer is not necessary to be provided for the object.

<Transfer Method>

Transfer using the transfer sheet according to the present invention may be performed directly onto the object (direct) or by transferring onto a receptive layer provided by an intermediate transfer recording medium (primary transfer) and then transferring the receptive layer of an intermediate transfer recording medium onto the object (retransfer), by using conventionally known thermal transfer printing machines. Transfer conditions for the thermal transfer printing machines may be set separately like for example, for sublimation transfer, for heat-fusion transfer or for protective layer transfer or printing energy may be appropriately adjusted respectively in a common printing machine. In addition, transfer can be performed by using heating methods such as, without particular limitation, thermal heads, hot plates, hot stampers, heat rolls, line heaters or irons.

EXAMPLES

The present invention is further illustrated by the following working examples and comparative examples that are not intended as a limitation of the invention. Mass parts of the binder resins, silicone oils and wax components are described in solid content.

Example A—Example of the First Embodiment of the Present Invention

Example A1

A 6 µm-thick easy-adhesion treated polyester film was prepared as a substrate. A heat-resistant layer was formed by coating a coating liquid 1, having the following composition for the heat-resistant layer, onto the surface untreated with easy-adhesion of the said polyester film so that the coverage will be 1.0 g/m² when dried. A release layer was formed by coating a coating liquid 1, having the following composition for the release layer, onto the face treated with easy-adhesion so that the coverage will be 0.3 g/m² when dried. Then, a peel layer was formed by coating a coating liquid 1, having the following composition for the peel layer, onto the release layer so that the coverage will be 1.0 g/m² when dried. Then, a transfer sheet 1 was produced by forming the transfer layer by coating a coating liquid, having the following composition for the transfer layer, onto the peel layer so that the coverage will be 1.0 g/m² when dried.

<Coating Liquid 1 for Heat-Resistant Layer>

| | |
|---|---|
| Polyvinylbutyral resin (manufactured by Sekisui Chemical Co., Ltd., product name: S-LEC BX-1) | 2.0 parts |
| Isocyanate (manufactured by DIC, product name: BURNOCK D750) | 4.4 parts |
| Phosphoric ester-based surfactant (manufactured by Dai-Ichi Kogyo Seiyaku, product name: Plysurf A208N) | 1.3 parts |
| Talc (manufactured by Nippon Talc Co., Ltd., product name: Microace P-3) | 0.3 part |
| Viscosity adjusting solvent (Toluene/Methyl ethyl ketone = 1/1) | 92 parts |

<Coating Liquid 1 for Release Layer>

| | |
|---|---|
| Urethane-based resin | 25 parts |
| Acetal-based resin (manufactured by Sekisui Chemical Co., Ltd., product name: S-LECK KS-5) | 75 parts |
| Viscosity adjusting solvent (Toluene/Isopropyl alcohol = 1/1) | 1900 parts |

<Coating Liquid 1 for Peel Layer>

| | |
|---|---|
| Acrylic-based resin (manufactured by Shin-Nakamura Chemical Co., Ltd., Product name: VANARESIN GH-8701) | 5 parts |
| Vinyl chloride-vinyl acetate copolymer (manufactured by Nissin Chemical Industry Co., Ltd., product name: Solbin CNL) | 95 parts |
| Polyethylene wax | 1 part |
| Viscosity adjusting solvent (Toluene/Methyl ethyl ketone = 1/1) | 300 parts |

<Coating Liquid 1 for Transfer Layer>

| | |
|---|---|
| Vinyl chloride-vinyl acetate copolymer | 60 parts |
| Carbon black | 40 parts |
| Viscosity adjusting solvent (Toluene/Methyl ethyl ketone = 1/1) | 200 parts |

Example A2

Transfer sheet 2 was produced in the similar way as Example A1, except that the composition of the coating liquid for the peel layer was made as follows.
<Coating Liquid 2 for Peel Layer>

| | |
|---|---|
| Acrylic-based resin (manufactured by Shin-Nakamura Chemical Co., Ltd., Product name: VANARESIN GH-8701) | 5 parts |
| Vinyl chloride-vinyl acetate resin (manufactured by Nissin Chemical Industry Co., Ltd., product name: Solbin CNL) | 95 parts |
| Epoxy-modified silicone oil (manufactured by Shin-Etsu Chemical Co., Ltd., product name: KP-1800U) | 1 part |
| Viscosity adjusting solvent (Toluene/Methyl ethyl ketone = 1/1) | 300 parts |

Example A3

Transfer sheet 3 was produced in the similar way as Example A1, except that the composition of the coating liquid for the peel layer was made as follows.
<Coating Liquid 3 for Peel Layer>

| | |
|---|---|
| Acrylic-based resin (manufactured by Shin-Nakamura Chemical Co., Ltd., Product name: VANARESIN GH-8701) | 5 parts |
| Vinyl chloride-vinyl acetate resin (manufactured by Nissin Chemical Industry Co., Ltd., product name: Solbin CNL) | 95 parts |
| Epoxy-modified silicone oil (manufactured by Shin-Etsu Chemical Co., Ltd., product name: KP-1800U) | 4 parts |
| Polyethylene wax | 3 parts |
| Viscosity adjusting solvent (Toluene/Methyl ethyl ketone = 1/1) | 300 parts |

Example A4

Transfer sheet 4 was produced in the similar way as Example A1, except that the composition of the coating liquid for the peel layer was made as follows.
<Coating Liquid 4 for Peel Layer>

| | |
|---|---|
| Acrylic-based resin (manufactured by Shin-Nakamura Chemical Co., Ltd., Product name: VANARESIN GH-8701) | 10 parts |
| Vinyl chloride-vinyl acetate resin (manufactured by Nissin Chemical Industry Co., Ltd., product name: Solbin CNL) | 90 parts |
| Polyethylene wax | 1 part |
| Viscosity adjusting solvent (Toluene/Methyl ethyl ketone = 1/1) | 300 parts |

Example A5

Transfer sheet 5 was produced in the similar way as Example A1, except that the composition of the coating liquid for the peel layer was made as follows.
<Coating Liquid 5 for Peel Layer>

| | |
|---|---|
| Acrylic-based resin (manufactured by Shin-Nakamura Chemical Co., Ltd., Product name: VANARESIN GH-8701) | 10 parts |
| Vinyl chloride-vinyl acetate resin (manufactured by Nissin Chemical Industry Co., Ltd., product name: Solbin CNL) | 90 parts |
| Epoxy-modified silicone oil (manufactured by Shin-Etsu Chemical Co., Ltd., product name: KP-1800U) | 1 part |
| Polyethylene wax | 3 parts |
| Viscosity adjusting solvent (Toluene/Methyl ethyl ketone = 1/1) | 300 parts |

Example A6

Transfer sheet 6 was produced in the similar way as Example A1, except that the composition of the coating liquid for the peel layer was made as follows.
<Coating Liquid 6 for Peel Layer>

| | |
|---|---|
| Acrylic-based resin (manufactured by Shin-Nakamura Chemical Co., Ltd., Product name: VANARESIN GH-8701) | 10 parts |
| Vinyl chloride-vinyl acetate resin (manufactured by Nissin Chemical Industry Co., Ltd., product name: Solbin CNL) | 90 parts |
| Epoxy-modified silicone oil (manufactured by Shin-Etsu Chemical Co., Ltd., product name: KP-1800U) | 5 parts |
| Polyethylene wax | 5 parts |
| Viscosity adjusting solvent (Toluene/Methyl ethyl ketone = 1/1) | 300 parts |

Example A7

Transfer sheet 7 was produced in the similar way as Example A1, except that the composition of the coating liquid for the peel layer was made as follows.
<Coating Liquid 7 for Peel Layer>

| | |
|---|---|
| Acrylic-based resin (manufactured by Shin-Nakamura Chemical Co., Ltd., Product name: VANARESIN GH-8701) | 30 parts |

-continued

| | |
|---|---|
| Vinyl chloride-vinyl acetate resin (manufactured by Nissin Chemical Industry Co., Ltd., product name: Solbin CNL) | 70 parts |
| Polyethylene wax | 1 part |
| Viscosity adjusting solvent (Toluene/Methyl ethyl ketone = 1/1) | 300 parts |

Example A8

Transfer sheet 8 was produced in the similar way as Example A1, except that the composition of the coating liquid for the peel layer was made as follows.

<Coating Liquid 8 for Peel Layer>

| | |
|---|---|
| Acrylic-based resin (manufactured by Shin-Nakamura Chemical Co., Ltd., Product name: VANARESIN GH-8701) | 30 parts |
| Vinyl chloride-vinyl acetate resin (manufactured by Nissin Chemical Industry Co., Ltd., product name: Solbin CNL) | 70 parts |
| Epoxy-modified silicone oil (manufactured by Shin-Etsu Chemical Co., Ltd., product name: KP-1800U) | 1 part |
| Polyethylene wax | 3 parts |
| Viscosity adjusting solvent (Toluene/Methyl ethyl ketone = 1/1) | 300 parts |

Example A9

Transfer sheet 9 was produced in the similar way as Example A1, except that the composition of the coating liquid for the peel layer was made as follows.

<Coating Liquid 9 for Peel Layer>

| | |
|---|---|
| Acrylic-based resin (manufactured by Shin-Nakamura Chemical Co., Ltd., Product name: VANARESIN GH-8701) | 40 parts |
| Vinyl chloride-vinyl acetate resin (manufactured by Nissin Chemical Industry Co., Ltd., product name: Solbin CNL) | 60 parts |
| Polyethylene wax | 1 part |
| Viscosity adjusting solvent (Toluene/Methyl ethyl ketone = 1/1) | 300 parts |

Example A10

Transfer sheet 10 was produced in the similar way as Example A1, except that the composition of the coating liquid for the peel layer was made as follows.

<Coating Liquid 10 for Peel Layer>

| | |
|---|---|
| Acrylic-based resin (manufactured by Shin-Nakamura Chemical Co., Ltd., Product name: VANARESIN GH-8701) | 40 parts |
| Vinyl chloride-vinyl acetate resin (manufactured by Nissin Chemical Industry Co., Ltd., product name: Solbin CNL) | 60 parts |
| Epoxy-modified silicone oil (manufactured by Shin-Etsu Chemical Co., Ltd., product name: KP-1800U) | 5 parts |
| Polyethylene wax | 5 parts |
| Viscosity adjusting solvent (Toluene/Methyl ethyl ketone = 1/1) | 300 parts |

Example A11

Transfer sheet 11 was produced in the similar way as Example A1, except that the composition of the coating liquids for the release layer and the peel layer were made as follows.

<Coating Liquid 11 for Release Layer>

| | |
|---|---|
| Urethane-based resin | 30 parts |
| Acetal-based resin (manufactured by Sekisui Chemical Co., Ltd., product name: S-LECK KS-5) | 70 parts |
| Viscosity adjusting solvent (Toluene/Isopropyl alcohol = 1/1) | 1900 parts |

<Coating Liquid 11 for Peel Layer>

| | |
|---|---|
| Acrylic-based resin (manufactured by Shin-Nakamura Chemical Co., Ltd., Product name: VANARESIN GH-8701) | 10 parts |
| Vinyl chloride-vinyl acetate resin (manufactured by Nissin Chemical Industry Co., Ltd., product name: Solbin CNL) | 90 parts |
| Epoxy-modified silicone oil (manufactured by Shin-Etsu Chemical Co., Ltd., product name: KP-1800U) | 1 part |
| Polyethylene wax | 5 parts |
| Viscosity adjusting solvent (Toluene/Methyl ethyl ketone = 1/1) | 300 parts |

Example A12

Transfer sheet 12 was produced in the similar way as Example A1, except that the composition of the coating liquids for the release layer and the peel layer were those of coating liquid 3 for the release layer and coating liquid 11 for the peel layer respectively.

<Coating Liquid 3 for Release Layer>

| | |
|---|---|
| Urethane-based resin | 35 parts |
| Acetal-based resin (manufactured by Sekisui Chemical Co., Ltd., product name: S-LECK KS-5) | 65 parts |
| Viscosity adjusting solvent (Toluene/Isopropyl alcohol = 1/1) | 1900 parts |

Example A13

Transfer sheet 13 was produced in the similar way as Example A1, except that the composition of the coating liquids for the release layer and the peel layer were those of coating liquid 2 for the release layer and coating liquid 12 for the peel layer respectively.

<Coating Liquid 12 for Peel Layer>

| | |
|---|---|
| Acrylic-based resin (manufactured by Shin-Nakamura Chemical Co., Ltd., Product name: VANARESIN GH-8701) | 10 parts |
| Vinyl chloride-vinyl acetate resin (manufactured by Nissin Chemical Industry Co., Ltd., product name: Solbin CNL) | 90 parts |
| Epoxy-modified silicone oil (manufactured by Shin-Etsu Chemical Co., Ltd., product name: KP-1800U) | 1 part |
| Polyethylene wax | 5 parts |
| Viscosity adjusting solvent (Toluene/Methyl ethyl ketone = 1/1) | 300 parts |

Example A14

Transfer sheet 14 was produced in the similar way as Example A1, except that the composition of the coating liquids for the release layer and the peel layer were those of coating liquid 3 for the release layer and coating liquid 12 for the peel layer respectively.

Example A15

Transfer sheet 15 was produced in the similar way as Example A1, except that the composition of the coating liquids for the release layer and the peel layer were those of coating liquid 2 for the release layer and coating liquid 13 for the peel layer respectively.

<Coating Liquid 13 for Peel Layer>

| | |
|---|---|
| Acrylic-based resin (manufactured by Shin-Nakamura Chemical Co., Ltd., Product name: VANARESIN GH-8701) | 10 parts |
| Vinyl chloride-vinyl acetate resin (manufactured by Nissin Chemical Industry Co., Ltd., product name: Solbin CNL) | 90 parts |
| Epoxy-modified silicone oil (manufactured by Shin-Etsu Chemical Co., Ltd., product name: KP-1800U) | 1 part |
| Viscosity adjusting solvent (Toluene/Methyl ethyl ketone = 1/1) | 300 parts |

Example A16

Transfer sheet 16 was produced in the similar way as Example A1, except that the composition of the coating liquids for the release layer and the peel layer were those of coating liquid 3 for the release layer and coating liquid 13 for the peel layer respectively.

Example A17

Transfer sheet 17 was produced in the similar way as Example A1, except that the composition of the coating liquids for the release layer and the peel layer were those of coating liquid 2 for the release layer and coating liquid 14 for the peel layer respectively.

<Coating Liquid 14 for Peel Layer>

| | |
|---|---|
| Acrylic-based resin (manufactured by Shin-Nakamura Chemical Co., Ltd., Product name: VANARESIN GH-8701) | 15 parts |
| Vinyl chloride-vinyl acetate resin (manufactured by Nissin Chemical Industry Co., Ltd., product name: Solbin CNL) | 85 parts |
| Epoxy-modified silicone oil (manufactured by Shin-Etsu Chemical Co., Ltd., product name: KP-1800U) | 1 part |
| Viscosity adjusting solvent (Toluene/Methyl ethyl ketone = 1/1) | 300 parts |

Example A18

Transfer sheet 18 was produced in the similar way as Example A1, except that the composition of the coating liquids for the release layer and the peel layer were those of coating liquid 3 for the release layer and coating liquid 14 for the peel layer respectively.

Example A19

Transfer sheet 19 was produced in the similar way as Example A1, except that the composition of the coating liquids for the release layer and the peel layer were those of coating liquid 1 for the release layer and coating liquid 14 for the peel layer respectively.

Comparative Example A1

Transfer sheet 20 was produced in the similar way as Example A1, except that the composition of the coating liquid for the peel layer was made as follows.

<Coating Liquid 15 for Peel Layer>

| | |
|---|---|
| Vinyl chloride-vinyl acetate resin (manufactured by Nissin Chemical Industry Co., Ltd., product name: Solbin CNL) | 100 parts |
| Epoxy-modified silicone oil (manufactured by Shin-Etsu Chemical Co., Ltd., product name: KP-1800U) | 4 parts |
| Polyethylene wax | 3 parts |
| Viscosity adjusting solvent (Toluene/Methyl ethyl ketone = 1/1) | 300 parts |

Comparative Example A2

Transfer sheet 21 was produced in the similar way as Example A1, except that the composition of the coating liquid for the peel layer was made as follows.

<Coating Liquid 16 for Peel Layer>

| | |
|---|---|
| Acrylic-based resin (manufactured by Shin-Nakamura Chemical Co., Ltd., Product name: VANARESIN GH-8701) | 50 parts |
| Vinyl chloride-vinyl acetate resin (manufactured by Nissin Chemical Industry Co., Ltd., product name: Solbin CNL) | 50 parts |
| Epoxy-modified silicone oil (manufactured by Shin-Etsu Chemical Co., Ltd., product name: KP-1800U) | 1 part |
| Polyethylene wax | 3 parts |
| Viscosity adjusting solvent (Toluene/Methyl ethyl ketone = 1/1) | 300 parts |

Comparative Example A3

Transfer sheet 22 was produced in the similar way as Example A1, except that the composition of the coating liquid for the peel layer was made as follows.

<Coating Liquid 17 for Peel Layer>

| | |
|---|---|
| Acrylic-based resin (manufactured by Shin-Nakamura Chemical Co., Ltd., Product name: VANARESIN GH-8701) | 70 parts |
| Vinyl chloride-vinyl acetate resin (manufactured by Nissin Chemical Industry Co., Ltd., product name: Solbin CNL) | 30 parts |
| Epoxy-modified silicone oil (manufactured by Shin-Etsu Chemical Co., Ltd., product name: KP-1800U) | 4 parts |
| Polyethylene wax | 3 parts |
| Viscosity adjusting solvent (Toluene/Methyl ethyl ketone = 1/1) | 300 parts |

Comparative Example A4

Transfer sheet 23 was produced in the similar way as Example A1, except that the composition of the coating liquid for the peel layer was made as follows.

<Coating Liquid 18 for Peel Layer>

| | |
|---|---|
| Acrylic-based resin (manufactured by Shin-Nakamura Chemical Co., Ltd., Product name: VANARESIN GH-8701) | 100 parts |
| Epoxy-modified silicone oil (manufactured by Shin-Etsu Chemical Co., Ltd., product name: KP-1800U) | 4 parts |
| Polyethylene wax | 3 parts |
| Viscosity adjusting solvent (Toluene/Methyl ethyl ketone = 1/1) | 300 parts |

Comparative Example A5

Transfer sheet 24 was produced in the similar way as Example A1, except that the composition of the coating liquid for the peel layer was made as follows.

<Coating Liquid 19 for Peel Layer>

| | |
|---|---|
| Vinyl chloride-vinyl acetate resin (manufactured by Nissin Chemical Industry Co., Ltd., product name: Solbin CNL) | 100 parts |
| Viscosity adjusting solvent (Toluene/Methyl ethyl ketone = 1/1) | 300 parts |

Comparative Example A6

Transfer sheet 25 was produced in the similar way as Example A1, except that the composition of the coating liquid for the peel layer was made as follows.

<Coating Liquid 20 for Peel Layer>

| | |
|---|---|
| Acrylic-based resin (manufactured by Shin-Nakamura Chemical Co., Ltd., Product name: VANARESIN GH-8701) | 100 parts |
| Viscosity adjusting solvent (Toluene/Methyl ethyl ketone = 1/1) | 300 parts |

Comparative Example A7

Transfer sheet 26 was produced in the similar way as Example A1, except that the composition of the coating liquids for the release layer and the peel layer were those of coating liquid 4 for the release layer and coating liquid 20 for the peel layer respectively.

<Coating Liquid 4 for Release Layer>

| | |
|---|---|
| Urethane-based resin | 80 parts |
| Acetal-based resin (manufactured by Sekisui Chemical Co., Ltd., product name: S-LECK KS-5) | 20 parts |
| Viscosity adjusting solvent (Toluene/Isopropyl alcohol = 1/1) | 1900 parts |

Example B—Example of the Second Embodiment of the Present Application

Examples B1 to B19

Transfer sheets 1 to 19 of Examples 1 to 19 are used as is of the transfer sheets 1 to 19 of Examples A1 to A19 respectively.

Comparative Example B1

Transfer sheet 20 was produced in the similar way as Example 1, except that the composition of the coating liquids for the release layer and the peel layer were those of coating liquid 4 for the release layer and coating liquid 15 for the peel layer respectively.

<Coating Liquid 4 for Release Layer>

| | |
|---|---|
| Urethane-based resin | 80 parts |
| Acetal-based resin (manufactured by Sekisui Chemical Co., Ltd., product name: S-LECK KS-5) | 20 parts |
| Viscosity adjusting solvent (Toluene/Isopropyl alcohol = 1/1) | 1900 parts |

<Coating Liquid 15 for Peel Layer>

| | |
|---|---|
| Acrylic-based resin (manufactured by Shin-Nakamura Chemical Co., Ltd., Product name: VANARESIN GH-8701) | 100 parts |
| Viscosity adjusting solvent (Toluene/Methyl ethyl ketone = 1/1) | 300 parts |

Comparative Example B2

Transfer sheet 21 was produced in the similar way as Example 1, except that the composition of the coating liquids for the release layer and the peel layer were those of coating liquid 4 for the release layer and coating liquid 11 for the peel layer respectively.

Comparative Example B3

Transfer sheet 22 was produced in the similar way as Example 1 except that the composition of the coating liquids for the release layer and the peel layer were those of coating liquid 5 for the release layer and coating liquid 11 for the peel layer respectively.

<Coating Liquid 5 for Release Layer>

| | |
|---|---|
| Urethane-based resin | 60 parts |
| Acetal-based resin (manufactured by Sekisui Chemical Co., Ltd., product name: S-LECK KS-5) | 40 parts |
| Viscosity adjusting solvent (Toluene/Isopropyl alcohol = 1/1) | 1900 parts |

[Performance Evaluation A/B of the Transfer Sheet]
(1A) Evaluation of Reproducibility of Thin Line Printed materials were prepared by, using the transfer sheets produced in Examples A1 to 14, Comparative Examples A1 to 7, Examples B1 to 14 and Comparative Examples B1 to 3 with a test printing machine (thermal head; manufactured by KYOCERA Corporation, product name: KEE-5712GAN2-STA) and transferring under the following transfer conditions onto a polyvinyl chloride made card. Thin line reproducibility was evaluated by, calculating the area ratio of the white colored and the black colored thin line part of the prepared printed materials against the area of the input image (theoretical value). "-" in the table indicates that printing was not possible.

<Transfer Conditions>
Printing conditions: 3.0 msec/line, 18.5V
Printing patterns: indicated in FIG. 2 (white and black lines)
Object: polyvinyl chloride made card (2A) Evaluation of Storage Stability The transfer sheets produced in Examples A1 to 14, Comparative Examples A1 to 7, Examples B1 to 14 and Comparative Examples B1 to 3 were stored for 96 hours under a 50° C. dry environment. Printed materials were prepared in the similar way as (1A) Evaluation of reproducibility of thin line, using the transfer sheets before and after storage respectively. Thin line reproducibility was evaluated by, calculating the area ratio of the white colored and the black colored thin line part of the printed materials, prepared by using the transfer sheet after storage against the area of the white colored and the black colored thin line part of the printed materials, prepared by using the transfer sheet before storage.

(1B) Evaluation of Thin Line Reproducibility

Firstly, an intermediate transfer media was prepared as follows.

(Preparation of Intermediate Transfer Media)

A peel layer was formed by, using a 12 μm-thick polyethylene terephthalate (PET) film as a substrate, coating a coating liquid having the following composition for the peel layer onto one face of the substrate by a gravure coating method, so that the coverage will be 1.0 μm after dried, and drying. Then, a primer layer was formed by coating and drying a coating liquid as follows for the primer layer onto the peel layer by a gravure coating method so that the coverage will be 1.0 μm after dried. Then, a protective layer was formed by, coating a coating liquid as follows for the protective layer onto the primer layer by a gravure coating method so that the coverage will be 2.0 μm after dried, and drying. Then, an intermediate transfer medium 1 was made by forming a receptive layer by, coating coating liquid 1 as follows for the receptive layer on to the protective layer by a gravure coating method, so that the coverage will be 2.5 μm after dried, and drying. The peel layer/the primer layer/the protective layer/the receptive layer construct the transfer layer of the intermediate transfer medium and the transfer layer is a layer retransferred on to the object.

<Coating Liquid for Peel Layer>

| Acrylic-based resin (manufactured by MITSUBISHI RAYON Co., Ltd., product name: BR-87) | 95 parts |
| Polyester-based resin (manufactured by TOYOBO Co., Ltd., product name: VYLON 200) | 5 parts |
| Toluene | 200 parts |
| MEK | 200 parts |

<Coating Liquid for Forming Protective Layer>

| Polyester-based resin (manufactured by UNITIKA Ltd., product name: UE-9885, number average molecular weight 6000, Tg = 82° C.) | 20 parts |
| Toluene | 40 parts |
| MEK | 40 parts |

<Coating Liquid 18 for Receptive Layer>

| Vinyl chloride-vinyl acetate copolymer (manufactured by Nissin Chemical Industry Co., Ltd., product name: CNL, Mn: 12000) | 95 parts |
| Epoxy-modified silicone oil (manufactured by Shin-Etsu Chemical Co., Ltd., product name: KP-1800U) | 5 parts |
| Toluene | 200 parts |
| Methyl ethyl ketone | 200 parts |

Secondly, printing patterns were transferred onto the receptive layer of the intermediate transfer media prepared as above by using the transfer sheets prepared in Examples A15 to A19 and Examples B15 to B19 as above with a test printing machine as follows.

(Test Printing Machine)
Thermal head: KEE-57-12GAN2-STA (manufactured by KYOCERA Corporation)
Heating element average resistance value: 3303 (Ω)
Main scanning direction printing density: 300 dpi
Sub scanning direction printing density: 300 dpi
Printing voltage: 18 (V)
1 line cycle: 3.0 (msec.)
Printing starting temperature: 35(° C.)
Pulse duty ratio: 85%

Subsequently, the transfer sheets of each image formation were retransferred on to white-colored vinyl chloride cards under the following conditions and thin line reproducibility was evaluated by calculating the ratio of the area of the white color and the black color thin line parts of the prepared printed matters.

(Retransfer Conditions)
Laminator: Lamipacker LPD3212 (manufactured by FUJIPLA Inc.)
Temperature: 145° C., 140° C., 135° C.
Speed: 0.8 (Set value)

(2B) Evaluation of Storage Stability

The transfer sheets produced in Examples A15 to 19 and Examples B15 to 19 and were stored for 96 hours under a 50° C. dry environment. Printed materials were prepared in the similar way as (1B) Evaluation of reproducibility of thin line, using the transfer sheets before and after storage respectively. Thin line reproducibility was evaluated by, calculating the area ratio of the white colored and the black colored thin line part of the printed materials, prepared by using the transfer sheet after storage against the area of the white colored and the black colored thin line part of the printed materials, prepared by using the transfer sheet before storage.

Results of each evaluation as above were indicated in Tables 1 and 2. The better the reproducibility of the white line, smudges were less in the printed materials and the better the reproducibility of the black line, blurs were less in the printed materials. It was found that by using the transfer sheet according to the present invention, the printed materials have excellent reproducibility of the white and the black color lines, in other words, smudges and blurs were less in the printed materials. Further, it was found that by adding silicone oils and/or wax components in the peel layer, the printed materials have excellent reproducibility of the white and the black color lines, in other words, smudges and blurs were less in the printed materials (excellent storage stability), even after storing the transfer sheets under high temperature environment.

TABLE 1

| | Release layer | | Peel layer | | | | | (1)Reproducibility of thin line | | (2)Storage stability | |
|---|---|---|---|---|---|---|---|---|---|---|---|
| | Urethane-base | Acetal-base | Acrylic-base | vinyl chloride-vinyl acetate | Si oil | wax | Transfer method | White thin line | Black thin line | White thin line | Black thin line |
| Example A1 | 25 | 75 | 5 | 95 | 0 | 1 | Direct | 82 | 112 | 117 | 85 |
| Example A2 | 25 | 75 | 5 | 95 | 1 | 0 | Direct | 85 | 115 | 110 | 90 |
| Example A3 | 25 | 75 | 5 | 95 | 4 | 3 | Direct | 90 | 117 | 100 | 100 |
| Example A4 | 25 | 75 | 10 | 90 | 0 | 1 | Direct | 100 | 102 | 115 | 86 |
| Example A5 | 25 | 75 | 10 | 90 | 1 | 3 | Direct | 100 | 103 | 103 | 98 |
| Example A6 | 25 | 75 | 10 | 90 | 5 | 5 | Direct | 100 | 104 | 107 | 90 |
| Example A7 | 25 | 75 | 30 | 70 | 0 | 1 | Direct | 100 | 98 | 116 | 85 |
| Example A8 | 25 | 75 | 30 | 70 | 1 | 3 | Direct | 100 | 100 | 102 | 97 |
| Example A9 | 25 | 75 | 40 | 60 | 0 | 1 | Direct | 108 | 86 | 116 | 87 |
| Example A10 | 25 | 75 | 40 | 60 | 5 | 5 | Direct | 106 | 91 | 108 | 91 |
| Example A11 | 30 | 70 | 10 | 90 | 1 | 5 | Direct | 98 | 103 | 99 | 99 |
| Example A12 | 35 | 65 | 10 | 90 | 1 | 5 | Direct | 103 | 98 | 99 | 96 |
| Example A13 | 30 | 70 | 15 | 85 | 1 | 5 | Direct | 100 | 100 | 101 | 99 |
| Example A14 | 35 | 65 | 15 | 85 | 1 | 5 | Direct | 103 | 96 | 99 | 96 |
| Comparative Example A1 | 25 | 75 | 0 | 100 | 4 | 3 | Direct | 32 | 135 | 100 | 98 |
| Comparative Example A2 | 25 | 75 | 50 | 50 | 1 | 3 | Direct | 112 | 125 | 112 | 86 |
| Comparative Example A3 | 25 | 75 | 70 | 30 | 4 | 3 | Direct | 115 | 58 | 99 | 97 |
| Comparative Example A4 | 25 | 75 | 100 | 0 | 4 | 3 | Direct | 135 | 38 | 98 | 96 |
| Comparative Example A5 | 25 | 75 | 0 | 100 | 0 | 0 | Direct | 38 | 130 | 165 | 38 |
| Comparative Example A6 | 25 | 75 | 100 | 0 | 0 | 0 | Direct | 130 | 35 | 169 | 29 |
| Comparative Example A7 | 80 | 20 | 100 | 0 | 0 | 0 | Direct | — | — | — | — |
| Example A15 | 30 | 70 | 10 | 90 | 1 | 0 | Retransfer | 98 | 100 | 99 | 99 |
| Example A16 | 35 | 65 | 10 | 90 | 1 | 0 | Retransfer | 103 | 98 | 99 | 96 |
| Example A17 | 30 | 70 | 15 | 85 | 1 | 0 | Retransfer | 100 | 100 | 101 | 99 |
| Example A18 | 35 | 65 | 15 | 85 | 1 | 0 | Retransfer | 103 | 98 | 99 | 96 |
| Example A19 | 25 | 75 | 15 | 85 | 1 | 0 | Retransfer | 97 | 100 | 99 | 99 |

TABLE 2

| | Release layer | | Peel layer | | | | | (1) Reproducibility of thin line | | (2)Storage stability | |
|---|---|---|---|---|---|---|---|---|---|---|---|
| | Urethane-base | Acetal-base | Acrylic-base | vinyl chloride-vinyl acetate | Si oil | wax | Transfer method | White thin line | Black thin line | White thin line | Black thin line |
| Example B1 | 25 | 75 | 5 | 95 | 0 | 1 | Direct | 82 | 112 | 117 | 85 |
| Example B2 | 25 | 75 | 5 | 95 | 1 | 0 | Direct | 85 | 115 | 110 | 90 |
| Example B3 | 25 | 75 | 5 | 95 | 4 | 3 | Direct | 90 | 117 | 100 | 100 |
| Example B4 | 25 | 75 | 10 | 90 | 0 | 1 | Direct | 100 | 102 | 115 | 86 |
| Example B5 | 25 | 75 | 10 | 90 | 1 | 3 | Direct | 100 | 103 | 103 | 98 |
| Example B6 | 25 | 75 | 10 | 90 | 5 | 5 | Direct | 100 | 104 | 107 | 90 |
| Example B7 | 25 | 75 | 30 | 70 | 0 | 1 | Direct | 100 | 98 | 116 | 85 |
| Example B8 | 25 | 75 | 30 | 70 | 1 | 3 | Direct | 100 | 100 | 102 | 97 |
| Example B9 | 25 | 75 | 40 | 60 | 0 | 1 | Direct | 108 | 86 | 116 | 87 |
| Example B10 | 25 | 75 | 40 | 60 | 5 | 5 | Direct | 106 | 91 | 108 | 91 |
| Example B11 | 30 | 70 | 10 | 90 | 1 | 5 | Direct | 98 | 103 | 99 | 99 |
| Example B12 | 35 | 65 | 10 | 90 | 1 | 5 | Direct | 103 | 98 | 99 | 96 |

TABLE 2-continued

| | Release layer | | Peel layer acrylic-base | vinyl chloride-vinyl acetate | Si oil | wax | Transfer method | (1) Reproducibility of thin line | | (2) Storage stability | |
|---|---|---|---|---|---|---|---|---|---|---|---|
| | Urethane-base | Acetal-base | | | | | | White thin line | Black thin line | White thin line | Black thin line |
| Example B13 | 30 | 70 | 15 | 85 | 1 | 5 | Direct | 100 | 100 | 101 | 99 |
| Example B14 | 35 | 65 | 15 | 85 | 1 | 5 | Direct | 103 | 96 | 99 | 96 |
| Comparative Example B1 | 80 | 20 | 100 | 0 | 0 | 0 | Direct | — | — | — | — |
| Comparative Example B2 | 80 | 20 | 10 | 90 | 1 | 5 | Direct | 110 | 35 | 102 | 95 |
| Comparative Example B3 | 60 | 40 | 10 | 90 | 1 | 5 | Direct | 105 | 80 | 102 | 95 |
| Example B15 | 30 | 70 | 10 | 90 | 1 | 0 | Retransfer | 98 | 100 | 99 | 99 |
| Example B16 | 35 | 65 | 10 | 90 | 1 | 0 | Retransfer | 103 | 98 | 99 | 96 |
| Example B17 | 30 | 70 | 15 | 85 | 1 | 0 | Retransfer | 100 | 100 | 101 | 99 |
| Example B18 | 35 | 65 | 15 | 85 | 1 | 0 | Retransfer | 103 | 98 | 99 | 96 |
| Example B19 | 25 | 75 | 15 | 85 | 1 | 0 | Retransfer | 97 | 100 | 99 | 99 |

Example C—Example of the Third Embodiment of the Present Invention

Example C1

A heat-resistant layer was formed by, coating a coating liquid, having the following composition for the heat-resistant layer, onto one face of a 4.5 μm-thick biaxially-stretched polyethylene terephthalate film (manufactured by TORAY Industries, Inc., Lumirror), as substrate, by a wire bar coating method, so that the coated amount will be 1.0 g/m² when dried, and drying. Secondly, a peel layer was formed by, coating a coating liquid, having the following composition for the peel layer, onto the opposite face of the heat-resistant layer formed on the above stated substrate sheet by gravure coating, so that the coated amount will be 0.5 g/m² when dried, and drying. Further, an intermediate layer was formed by coating a coating liquid 1, having the following composition for the intermediate layer, onto the peel layer by gravure coating, so that the coated amount will be 1.5 g/m² when dried, and drying. Further, a thermal transfer sheet of Example 1 was prepared by forming a transfer layer by, coating a coating liquid, having the following composition for the transfer sheet, onto the intermediate layer by gravure coating, so that the coated amount will be 1.5 g/m² when dried, and drying.

(Coating Liquid Composition for Heat-Resistant Layer)

| | |
|---|---|
| Polyvinylbutyral resin (manufactured by Sekisui Chemical Co., Ltd., product name: S-LEC BX-1) | 3.6 parts |
| Polyisocyanate (manufactured by DIC, product name: BURNOCK D750) | 8.6 parts |
| Phosphoric ester-based surfactant (manufactured by Dai-Ichi Kogyo Seiyaku, product name: Plysurf A208S) | 2.8 parts |
| Talc (manufactured by Nippon Talc Co., Ltd., product name: Microace P-3) | 0.7 parts |
| Methyl ethyl ketone | 32.0 parts |
| Toluene | 32.0 parts |

(Coating Liquid for Peel Layer)

| | |
|---|---|
| Polymethylmethacrylate (PMMA)(Dianal BR-87, Mitsubishi Rayon Co., Ltd.) | 20 parts |
| Toluene | 40 parts |
| MEK (methyl ethyl ketone) | 40 parts |

(Coating Liquid 1 for Intermediate Layer)

| | |
|---|---|
| Polyvinyl pyrrolidone resin (K-90, ISP) | 3 parts |
| Alumina sol (Size of average primary particle: 10 × 100 nm, solid content 10%, Alumina sol 200, Nissan Chemical Industries, Ltd.) | 30 parts |
| Water | 50 parts |
| IPA (isopropyl alcohol) | 17 parts |

(Coating Liquid for Transfer Layer)

| | |
|---|---|
| Colorant (Dispersant of carbon black: solid content 46% proportion is carbon black 40%, dispersant 6%, remainder is toluene/ethyl acetate = 1/1) | 30.2 parts |
| Vinyl chloride-vinyl acetate copolymer (product name: Solbin CNL, solid content 30%, glass transition temperature 75° C., weight average molecular weight 20000, manufactured by Nissin Chemical Industry Co., Ltd.) | 37.0 parts |
| Toluene/Methyl ethyl ketone = 50/50 (mass ratio) | 32.8 parts |

Example C2

A thermal transfer sheet for Example 2 was prepared in a similar way as Example 1 as described above, except that the coating liquid 1 for the intermediate layer was changed to the following composition from the thermal transfer sheet of Example 1, as described above.

(Coating Liquid 2 for Intermediate Layer)

| | |
|---|---|
| Polyvinyl pyrrolidone resin (K-90, ISP) | 3 parts |
| Colloidal silica (size of average particle: 4~6 nm, solid content 10%, SNOWTEX OSX, Nissan Chemical Industries, Ltd.) | 30 parts |
| Water | 50 parts |
| IPA (isopropyl alcohol) | 17 parts |

Example C3

A thermal transfer sheet for Example 3 was prepared in a similar way as Example 1 as described above, except that the coating liquid 1 for the intermediate layer was changed to the following composition from the thermal transfer sheet of Example 1, as described above.

(Coating Liquid 3 for Intermediate Layer)

| | |
|---|---|
| Urethane resin (solid content 35%, F-2850D, Dai-Ichi Kogyo Seiyaku) | 10 parts |
| Alumina sol (Size of average primary particle: 10 × 100 nm, solid content 10%, Alumina sol 200, Nissan Chemical Industries, Ltd.) | 15 parts |
| Water | 37.5 parts |
| IPA (isopropyl alcohol) | 37.5 parts |

Example C4

A thermal transfer sheet for Example 4 was prepared in a similar way as Example 1 as described above, except that the coating liquid 1 for the intermediate layer was changed to the following composition from the thermal transfer sheet of Example 1, as described above.

(Coating Liquid 4 for Intermediate Layer)

| | |
|---|---|
| Polyvinyl alcohol (PVA-203, KURARAY Co., Ltd.) | 3 parts |
| Alumina sol (Size of average primary particle: 10 × 100 nm, solid content 10%, Alumina sol 200, Nissan Chemical Industries, Ltd.) | 15 parts |
| Water | 37.5 parts |
| Methanol | 37.5 parts |

Example C5

A thermal transfer sheet for Example 5 was prepared in a similar way as Example 1 as described above, except that the coating liquid 1 for the intermediate layer was changed to the following composition from the thermal transfer sheet of Example 1, as described above.

(Coating Liquid 5 for Intermediate Layer)

| | |
|---|---|
| Alumina sol (Size of average primary particle: 10 × 100 nm, solid content 10%, Alumina sol 200, Nissan Chemical Industries, Ltd.) | 60 parts |
| Water | 30 parts |
| IPA (isopropyl alcohol) | 10 parts |

Example C6

A thermal transfer sheet for Example 6 was prepared in a similar way as Example 1 as described above, except that the coating liquid 1 for the intermediate layer was changed to the following composition from the thermal transfer sheet of Example 1, as described above.

(Coating Liquid 6 for Intermediate Layer)

| | |
|---|---|
| Polyvinyl pyrrolidone resin (K-90, ISP) | 0.6 part |
| Alumina sol (Size of average primary particle: 10 × 100 nm, solid content 10%, Alumina sol 200, Nissan Chemical Industries, Ltd.) | 54 parts |
| Water | 34 parts |
| IPA (isopropyl alcohol) | 11.5 parts |

Example C7

A thermal transfer sheet for Example 7 was prepared in a similar way as Example 1 as described above, except that the coating liquid 1 for the intermediate layer was changed to the following composition from the thermal transfer sheet of Example 1, as described above.

(Coating Liquid 7 for Intermediate Layer)

| | |
|---|---|
| Polyvinyl pyrrolidone resin (K-90, ISP) | 1.8 parts |
| Alumina sol (Size of average primary particle: 10 × 100 nm, solid content 10%, Alumina sol 200, Nissan Chemical Industries, Ltd.) | 42 parts |
| Water | 42 parts |
| IPA (isopropyl alcohol) | 14.5 parts |

Example C8

A thermal transfer sheet for Example 8 was prepared in a similar way as Example 1 as described above, except that the coating liquid 1 for the intermediate layer was changed to the following composition from the thermal transfer sheet of Example 1, as described above.

(Coating Liquid 8 for Intermediate Layer)

| | |
|---|---|
| Polyvinyl pyrrolidone resin (K-90, ISP) | 4.8 parts |
| Alumina sol (Size of average primary particle: 10 × 100 nm, solid content 10%, Alumina sol 200, Nissan Chemical Industries, Ltd.) | 12 parts |
| Water | 62 parts |
| IPA (isopropyl alcohol) | 22 parts |

Example C9

A thermal sheet prepared in the similar way as Example 1 as described above was used as a thermal sheet for Example 9.

Example C10

A thermal sheet prepared in the similar way as Example 2 as described above was used as a thermal sheet for Example 10.

Example C11

A thermal sheet prepared in the similar way as Example 3 as described above was used as a thermal sheet for Example 11.

Example C12

A thermal sheet prepared in the similar way as Example 4 as described above was used as a thermal sheet for Example 12.

Comparative Example C1

A thermal transfer sheet for Comparative Example 1 consisting of a heat-resistant layer/a substrate sheet/a peel layer/a transfer layer was prepared in the similar way as Example 1, except that the intermediate layer was omitted from the construction of the thermal transfer sheet of Example 1, as described above.

Comparative Example C2

A thermal transfer sheet for Comparative Example 2 was prepared in a similar way as Example 1 as described above, except that the coating liquid 1 for the intermediate layer was changed to the following composition of the thermal transfer sheet from the construction of the thermal transfer sheet of Example 1, as described above.
(Coating Liquid 10 for Intermediate Layer)

| | |
|---|---|
| Polyvinyl pyrrolidone resin (K-90, ISP) | 3 parts |
| Water | 50 parts |
| IPA (isopropyl alcohol) | 17 parts |

[Performance Evaluation C of Transfer Sheet]

Evaluation of the quality of printing letters (quality of printing images) and adhesion between layers of the intermediate layer was performed by the method indicated as below, by using the transfer sheets prepared in Examples C1 to C8 and Comparative Examples C1 and C2, as described above.
(Quality of Printing Letters 1)

Printing was performed under the following printing conditions, by using the thermal transfer sheets prepared in Examples and Comparative Examples and a polyvinyl chloride card having the following conditions, and in 2 patterns, one having the thin line pattern in the running direction and the other in the direction perpendicular to the running direction, in which the thin line pattern had line width of 0.17 mm {(1 inch/300)×2} and the interspace of 1 mm. Further this was referred to as a positive pattern and printing was performed in a negative pattern also, which was corresponding to this positive pattern. Evaluation was performed by visually observing the existence or the nonexistence of the smudges and blurs of the image areas in the printed matters.

<Polyvinyl Chloride Card>

A 3-layered polyvinyl chloride card (54×86 cm) was prepared by preparing a center core (thickness of 0.2 mm), consisting of the following composition for the card substrate, making a transparent sheet (thickness of 0.15 mm), consisting of the following composition, and thermocompressing the above stated transparent sheet onto both sides of the above stated center core.

| (Composition of center core) | |
|---|---|
| Vinyl chloride compound (polymerization degree: 800, additive content such as stabilizer: about 10%) | 100 parts |
| White color pigment (titanium oxide) | 10 parts |
| Plasticizer (dioctylphthalate) | 0.5 part |

| (Composition of transparent sheet) | |
|---|---|
| Vinyl chloride compound (polymerization degree: 800, additive content such as stabilizer: about 10%) | 100 parts |
| Plasticizer (dioctylphthalate) | 0.5 part |

(Printing Conditions)

Thermal head: KGT-217-12MPL20 (manufactured by KYOCERA Corporation)
Heating element average resistance value: 3195 (Ω)
Main scanning direction printing density: 300 dpi
Sub scanning direction printing density: 300 dpi
Applied voltage: 0.13 (w/dot)
1 line cycle: 5 (msec.)
Printing starting temperature: 40(° C.)

Evaluation of blurs in the image areas as described above was performed based on the following criteria.

⊚: Good. No blurs in the image area.
○: Easy to read but the image area is partly blurred.
Δ: Readable but the image area is blurred.
×: Unreadable and defective. The image area is totally blurred.

Further, evaluation of smudges in the image areas as described above was performed based on the following criteria.

⊚: Good. No smudges in the image area.
○: Easy to read but the image area is partly smudged.
Δ: Readable but the image area is smudged.
×: Unreadable and defective. The image area is totally smudged.

(Printing Quality 2)

Firstly, an intermediate transfer medium was prepared as follows.
(Preparation of Intermediate Transfer Medium)

A peel layer was formed by, using a 12 μm-thick polyethylene terephthalate (PET) film as a substrate, coating a coating liquid, having the following composition for the peel layer, onto one face of the substrate, by a gravure coating method, so that the coverage will be 1.0μ after dried, and drying. Then, a primer layer was formed by, coating a coating liquid, having the following composition for the primer layer, onto the peel layer, by a gravure coating method, so that the coverage will be 1.0 μm after dried, and drying. Then, a protective layer was formed by, covering a coating layer, having the following composition for the protective layer, onto the primer layer, by a gravure coating method, so that the coverage will be 2.0 μm after dried, and drying. Then, an intermediate transfer medium 1 was made by forming a receptive layer by, coating a coating liquid 1, having the following composition for the receptive layer, onto the protective layer, by a gravure coating method, so that the coverage will be 2.5 μm after dried, and drying. The peel layer/the primer layer/the receptive layer constitute the transfer layer of the intermediate transfer medium, and the transfer layer is a layer retransferred onto the object.

<Coating Liquid for Peel Layer>

| | |
|---|---|
| Acrylic-based resin (manufactured by MITSUBISHI RAYON Co., Ltd., product name: BR-87) | 95 parts |
| Polyester-based resin (manufactured by TOYOBO Co., Ltd., product name: VYLON 200) | 5 parts |

-continued

| | |
|---|---|
| Toluene | 200 parts |
| MEK | 200 parts |

<Coating Liquid for Forming Protective Layer>

| | |
|---|---|
| Polyester-based resin (manufactured by UNITIKA Ltd., product name: UE-9885, number average molecular weight 6000, Tg = 82° C.) | 20 parts |
| Toluene | 40 parts |
| MEK | 40 parts |

<Coating Liquid for Receptive Layer>

| | |
|---|---|
| Vinyl chloride-vinyl acetate copolymer (manufactured by Nissin Chemical Industry Co., Ltd., product name: CNL, Mn: 12000) (CNL, Nissin Chemical Industry Co., Ltd.) | 95 parts |
| Epoxy-modified silicone oil (manufactured by Shin-Etsu Chemical Co., Ltd., product name: KP-1800U) | 5 parts |
| Toluene | 200 parts |
| Methyl ethyl ketone | 200 parts |

Secondly, printing patterns were transferred onto the receptive layers of the intermediate transfer media prepared, as described above, by using the transfer sheets produced in Examples C9 to C12, as described above, with a test printing machine, as described below.

(Test Printing Machine)
Thermal head: KEE-57-12GAN2-STA (manufactured by KYOCERA Corporation)
Heating element average resistance value: 3303 (Ω)
Main scanning direction printing density: 300 dpi
Sub scanning direction printing density: 300 dpi
Printing voltage: 18 (V)
1 line cycle: 3.0 (msec.)
Printing starting temperature: 35(° C.)
Pulse duty ratio: 85%

<Transfer Conditions>
Printing conditions: 3.0 msec/line, 18.5V
Printing pattern: printing pattern as indicated in FIG. 2 (white line and black line)
Object: Polyvinyl chloride made card Subsequently, the transfer sheets of each image formation were retransferred onto white-colored vinyl chloride cards under the following conditions, and printing quality was evaluated under the above stated evaluation criteria, by calculating the ratio of the area of the white and the black color thin line parts of the prepared printed matters.

(Retransfer Conditions)
Laminator: Lamipacker LPD3212 (manufactured by FUJIPLA Inc.)
Temperature: 145° C., 140° C., 135° C.
Speed: 0.8 (Set value)

(Adhesion between layers of intermediate layer) Adhesion between layers of intermediate layer of the thermal transfer sheet (adhesion of the peel and the intermediate layers and adhesion between the intermediate and the transfer layers) was evaluated under the following evaluation criteria when printing under printing conditions described as above, by using the thermal transfer sheet prepared in the Examples with the object described as above. When the adhesion between the layers of the intermediate layer of the thermal transfer sheet is defective, a phenomenon occurs that the peel layer remains on the substrate sheet side without totally transferring when printing at high temperatures.

◎: The area of the peel layer defectively transferred was 0%
○: The area of the peel layer defectively transferred was more than 0% and less than 10%.
Δ: The area of the peel layer defectively transferred was 10% or more and less than 30%
×: The area of the peel layer defectively transferred was 30% or more.

Evaluation results of the quality of printing letters and the adhesion between layers of the intermediate layer for the Examples and the Comparative Examples as described above are indicated in Table 1.

TABLE 3

| | | Solid layer | | | | | | Printing quality | | Adhesion between layers of intermediate layer |
|---|---|---|---|---|---|---|---|---|---|---|
| | Peel layer | Resin | Solid content ratio | Particle | Solid content ratio | Particle ratio | Transfer layer | Transfer method | Blurs | Smudges | |
| Example 1 | PMMA | PVP K-90 | 3 parts | Alumina sol | 3 parts | 50% | vinyl chloride-vinyl acetate + carbon | Direct | ◎ | ○ | ◎ |
| Example 2 | PMMA | PVP K-90 | 3 parts | Colloidal silica | 3 parts | 50% | vinyl chloride-vinyl acetate + carbon | Direct | ○ | ○ | ◎ |
| Example 3 | PMMA | Urethane F-2850D | 3.5 parts | Alumina sol | 3.5 parts | 30% | vinyl chloride-vinyl acetate + carbon | Direct | ○ | ○ | ◎ |
| Example 4 | PMMA | PVA-203 | 3 parts | Alumina sol | 3 parts | 33% | vinyl chloride-vinyl acetate + carbon | Direct | Δ | Δ | ○ |
| Example 5 | PMMA | PVP K-90 | 0 | Alumina sol | 6 parts | 100% | vinyl chloride-vinyl acetate + carbon | Direct | ◎ | ◎ | Δ |
| Example 6 | PMMA | PVP K-90 | 0.6 parts | Alumina sol | 5.4 parts | 90% | vinyl chloride-vinyl acetate + carbon | Direct | ◎ | ◎ | ○ |
| Example 7 | PMMA | PVP K-90 | 1.8 parts | Alumina sol | 4.2 parts | 70% | vinyl chloride-vinyl acetate + carbon | Direct | ◎ | ◎ | ◎ |
| Example 8 | PMMA | PVP K-90 | 4.8 parts | Alumina sol | 1.2 parts | 20% | vinyl chloride-vinyl acetate + carbon | Direct | Δ | Δ | ◎ |
| Example 9 | PMMA | PVP K-90 | 3 parts | Alumina sol | 3 parts | 50% | vinyl chloride-vinyl acetate + carbon | Retransfer | ◎ | ○ | ◎ |
| Example 10 | PMMA | PVP K-90 | 3 parts | Colloidal silica | 3 parts | 50% | vinyl chloride-vinyl acetate + carbon | Retransfer | ○ | ○ | ◎ |

TABLE 3-continued

| | Peel layer | Solid layer Resin | Solid content ratio | Particle | Solid content ratio | Particle ratio | Transfer layer | Transfer method | Printing quality Blurs | Smudges | Adhesion between layers of intermediate layer |
|---|---|---|---|---|---|---|---|---|---|---|---|
| Example 1 | PMMA | Urethane F-2850D | 3.5 parts | Alumina sol | 3.5 parts | 30% | vinyl chloride-vinyl acetate + carbon | Retransfer | ○ | ○ | ⊚ |
| Example 12 | PMMA | PVA-203 | 3 parts | Alumina sol | 3 parts | 33% | vinyl chloride-vinyl acetate + carbon | Retransfer | Δ | Δ | ○ |
| Comparative Example 1 | PMMA | | None | | | | vinyl chloride-vinyl acetate + carbon | Direct | X | X | — |
| Comparative Example 2 | PMMA | PVP K-90 | 3 parts | None | | | vinyl chloride-vinyl acetate + carbon | Direct | Δ | X | — |

As indicated in table 3, printed matters with the thermal transfer sheets according to the invention of Examples 1 to 12 were found with no blurs or smudges in all the image areas, i.e. thin lines, or readable. This meant that transfer of thin lines was possible under conditions of low application energy in printing and good in printing quality. In comparison, printed matters with the thermal transfer sheet of Comparative Example 1 had blurs and smudges in the thin lines and the transfer of the thin lines failed under conditions of low application energy when printing and printing quality was poor. Further, printed matters with the thermal transfer sheet of Comparative Example 2 had slight blurs and also smudges in the thin lines and was defective. In addition, the thermal transfer sheets according to the invention of Examples 1 to 12 were excellent in adhesion between the layers of the intermediate layer.

DESCRIPTION OF REFERENCE CHARACTERS

10, 20 Transfer sheet
11, 21 Substrate
12, 22 Release layer
13, 23 Peel layer
14, 24 Transfer layer
15, 25 Heat-resistant layer
26 Intermediate layer

The invention claimed is:

1. A transfer sheet comprising a substrate, and a release layer, a peel layer and a transfer layer on the substrate in this order, wherein
the peel layer contains a binder resin containing an acrylic-based resin of more than 0 mass % and 49 mass % or less and a vinyl chloride-vinyl acetate resin of 51 mass % or more and less than 100 mass %; and
the transfer layer contains carbon black.

2. The transfer sheet according to claim 1, wherein the release layer contains a binder resin containing urethane-based resins, acetal-based resins, melamine-based resins, polyol resins, cellulosic resins, and polyvinyl alcohols.

3. The transfer sheet according to claim 1, wherein the peel layer further contains a silicone oil and/or a wax component.

4. The transfer sheet according to claim 3, wherein the total amount of the silicone oil and the wax component in the peel layer is 0.1 mass % or more and 15 mass % or less, based on the solid content of mass of the binder resin.

5. A transfer sheet comprising a substrate, and a release layer, a peel layer and a transfer layer on the substrate in this order, wherein
the release layer contains a binder resin containing an urethane-based resin of more than 0 mass % and 49 mass % or less and an acetal-based resin of 51 mass % or more and less than 100 mass %.

6. The transfer sheet according to claim 5, wherein the peel layer contains a binder resin containing an acrylic-based resin of more than 0 mass % and 49 mass % or less and a vinyl chloride-vinyl acetate resin of 51 mass % or more and less than 100 mass %.

7. The transfer sheet according to claim 5, wherein the transfer layer contains a colorant.

8. A transfer sheet comprising a substrate, and a peel layer, an intermediate layer and a transfer layer on the substrate in this order, wherein
the peel layer contains a binder resin containing an acrylic-based resin of more than 0 mass % and 49 mass % or less and a vinyl chloride-vinyl acetate resin of 51 mass % or more and less than 100 mass %; and
the intermediate layer contains at least an inorganic colloid material.

9. The transfer sheet according to claim 8, wherein the inorganic colloid material is at least one of alumina sol and colloidal silica.

* * * * *